(12) United States Patent
Chen

(10) Patent No.: US 9,800,131 B1
(45) Date of Patent: Oct. 24, 2017

(54) PHASE CONTROLLER AND MULTI-PHASE VOLTAGE CONVERTER USING THE SAME

(71) Applicant: ANPEC ELECTRONICS CORPORATION, Hsinchu (TW)

(72) Inventor: Chih-Yuan Chen, Hsinchu (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 0 days.

(21) Appl. No.: 15/231,920

(22) Filed: Aug. 9, 2016

(30) Foreign Application Priority Data

May 11, 2016 (TW) .............................. 105114560 A

(51) Int. Cl.
  *H02M 3/158* (2006.01)
  *G05F 1/44* (2006.01)
  *H02M 1/084* (2006.01)

(52) U.S. Cl.
  CPC ............ *H02M 1/084* (2013.01); *H02M 3/158* (2013.01)

(58) Field of Classification Search
  CPC ...... H02M 3/156; H02M 3/157; H02M 3/158; H02M 3/1584; H02M 3/1582; G05F 1/455; G05F 1/40; G05F 1/44; G05F 1/614
  USPC ........ 323/217, 225, 271, 272, 282–285, 351
  See application file for complete search history.

(56) References Cited

U.S. PATENT DOCUMENTS

| | | | | |
|---|---|---|---|---|
| 6,215,290 B1 * | 4/2001 | Yang | ................... | H02M 3/1584 323/282 |
| 6,362,608 B1 * | 3/2002 | Ashburn | ............. | H02M 3/1584 323/272 |
| 6,650,556 B2 * | 11/2003 | Dinh | ................... | H02M 3/1584 323/282 |
| 6,844,710 B2 * | 1/2005 | Lipcsei | ................. | H02M 1/088 323/284 |
| 7,098,642 B2 * | 8/2006 | Lipcsei | ................. | H02M 1/088 323/284 |
| 7,521,913 B2 * | 4/2009 | Tang | ................... | H02M 3/1584 323/272 |
| 7,570,036 B2 * | 8/2009 | Tang | ................... | H02M 3/1584 323/272 |
| 8,063,621 B2 * | 11/2011 | Harriman | ............ | H02M 3/1584 323/272 |
| 8,570,009 B2 * | 10/2013 | Wei | ....................... | H02M 3/156 323/272 |
| 8,963,519 B2 * | 2/2015 | Zambetti | ............... | H02M 3/156 323/271 |

(Continued)

*Primary Examiner* — Adolf Berhane
(74) *Attorney, Agent, or Firm* — Li & Cai Intellectual Property (USA) Office

(57) ABSTRACT

Provided herein is a phase controller for a multi-phase voltage converter. The phase controller includes a plurality of logic control circuits, a phase selection circuit and a plurality of signal generators. The logic control circuits receive a plurality of phase-change signals and output a plurality of logic signals, respectively. The signal generators provide a plurality of bridge circuits with a plurality of phase selection signals to drive the bridge circuits. The phase selection circuit controls the signal generators according to the logic signals and a voltage determination signal. When the voltage determination signal stays at a high logic level for a pre-determined time period, the phase selection circuit controls the signal generators to output a plurality of phase selection signals at a high logic level to the bridge circuits such that the corresponding bridge circuits provide power at the same time.

20 Claims, 4 Drawing Sheets

(56) References Cited

U.S. PATENT DOCUMENTS

| | | | | |
|---|---|---|---|---|
| 8,963,521 B2* | 2/2015 | Wei | ............... | G05F 1/46 |
| | | | | 323/272 |
| 9,030,047 B2* | 5/2015 | Barus | ............... | G06F 1/28 |
| | | | | 307/65 |
| 9,231,463 B2* | 1/2016 | Oaklander | ............... | H03K 17/063 |
| 9,369,044 B2* | 6/2016 | Teh | ............... | H02M 3/1584 |
| 9,379,619 B2* | 6/2016 | Barnette | ............... | H02M 3/33507 |
| 2003/0081438 A1* | 5/2003 | Dinh | ............... | H02J 1/102 |
| | | | | 363/127 |
| 2004/0114398 A1* | 6/2004 | Lipcsei | ............... | H02M 1/088 |
| | | | | 363/41 |
| 2004/0217741 A1* | 11/2004 | Muratov | ............... | H02M 3/1584 |
| | | | | 323/219 |
| 2005/0088156 A1* | 4/2005 | Cheung | ............... | H02M 3/1584 |
| | | | | 323/282 |
| 2007/0290664 A1* | 12/2007 | Moyer | ............... | H02M 1/32 |
| | | | | 323/272 |
| 2008/0303495 A1* | 12/2008 | Wei | ............... | H02M 3/156 |
| | | | | 323/272 |
| 2010/0277961 A1* | 11/2010 | Moyer | ............... | H02M 3/1584 |
| | | | | 363/163 |
| 2012/0223692 A1* | 9/2012 | Prodic | ............... | H02M 3/1584 |
| | | | | 323/283 |
| 2013/0057239 A1* | 3/2013 | Kalje | ............... | H02M 3/1584 |
| | | | | 323/271 |
| 2014/0035548 A1* | 2/2014 | Oaklander | ............... | H03K 17/063 |
| | | | | 323/283 |
| 2015/0070940 A1* | 3/2015 | Sato | ............... | H02M 3/1584 |
| | | | | 363/17 |
| 2015/0288285 A1* | 10/2015 | Paul | ............... | H02M 3/1584 |
| | | | | 323/271 |

* cited by examiner

PHASE CONTROLLER AND MULTI-PHASE VOLTAGE CONVERTER USING THE SAME

BACKGROUND

1. Technical Field

The present invention generally relates to a phase controller and, more particularly, to a phase controller capable of driving a plurality of bridge circuits and a multi-phase voltage converter using the phase controller.

2. Description of Related Art

With the development of power management technology, DC-to-DC voltage converters have become widely used. Generally, DC-to-DC voltage converters are divided into three categories: boost converters, buck converters and buck-boost converters. A boost converter is capable of increasing the input voltage. On the contrary, a buck converter is capable of decreasing the input voltage. A buck-boost converter is capable of stepping up or down the input voltage. Among them, buck converters are more popular.

A multi-phase voltage converter includes a plurality of converter modules therein and uses the converter modules to process a single input voltage. More specifically, each of the converter modules usually includes an upper bridge switch and a lower bridge switch. A central controller of the multi-phase voltage converter controls the duty cycles of the upper bridge switch and the lower bridge switch such that the converter modules alternately provide an output voltage according to the input voltage.

However, the conventional multi-phase voltage converter has some drawbacks. More specifically, the conventional multi-phase voltage converter uses only one of the converter modules each time to provide the output voltage. In other words, the converter modules fail to provide power at the same time. When the back-end circuit is overloaded, the conventional multi-phase voltage converter that uses only one of the converter modules to provide the output voltage fails to provide the back-end circuit with sufficient power. For a two-phase DC-to-DC voltage converter, the maximum duty cycle of each converter module is 50%. Moreover, there is hardware limitation on the internal logic control circuit of the central controller that prevents the converter modules from providing power at the same time.

SUMMARY

One embodiment of the present invention provides a phase controller for a multi-phase voltage converter. The phase controller includes a plurality of logic control circuits, a phase selection circuit and a plurality of signal generators. The phase selection circuit is coupled to the plurality of logic control circuits and the plurality of signal generators. The plurality of logic control circuits is configured to receive a plurality of phase-change signals and output a plurality of logic signals according to the plurality of phase-change signals, respectively. The plurality of signal generators is configured to provide a plurality of bridge circuits with a plurality of phase selection signals to drive the plurality of bridge circuits. The phase selection circuit is configured to receive the plurality of logic signals and a voltage determination signal and control the plurality of signal generators according to the plurality of logic signals and the voltage determination signal. When an output voltage provided by the multi-phase voltage converter is higher than a pre-determined voltage, the phase selection circuit receives the voltage determination signal at a high logic level, and the phase selection circuit controls the plurality of signal generators to output the plurality of phase selection signals to the plurality of bridge circuits according to the plurality of logic signals and the voltage determination signal such that the plurality of bridge circuits conduct a phase change. When the voltage determination signal stays at a high logic level for a pre-determined time period, the phase selection circuit controls the plurality of signal generators to output a plurality of phase selection signals a high logic level to the plurality of bridge circuits such that the plurality of bridge circuits provide power at the same time to rapidly increase the output voltage.

One embodiment of the present invention further provides a multi-phase voltage converter. The multi-phase voltage converter includes a plurality of bridge circuits, a central controller and a phase controller. The phase controller includes a plurality of logic control circuits, a phase selection circuit and a plurality of signal generators. The central controller is coupled to an output terminal of the plurality of bridge circuits. The phase controller is coupled to the plurality of bridge circuits and the central controller. The phase selection circuit is coupled to the plurality of logic control circuits and the plurality of signal generators. The central controller is configured to generate a voltage determination signal according to an output voltage provided by the plurality of bridge circuits and generate a plurality of phase signals according to the voltage determination signal. The plurality of logic control circuits is configured to receive a plurality of phase-change signals and output a plurality of logic signals according to the plurality of phase-change signals, respectively. The plurality of signal generators is configured to provide the plurality of bridge circuits with a plurality of phase selection signals to drive the plurality of bridge circuits. The phase selection circuit is configured to receive the plurality of logic signals and the voltage determination signal and control the plurality of signal generators according to the plurality of logic signals and the voltage determination signal. When an output voltage provided by the multi-phase voltage converter is higher than a pre-determined voltage, said phase selection circuit receives the voltage determination signal at a high logic level, and the phase selection circuit controls said plurality of signal generators to output said plurality of phase selection signals to said plurality of bridge circuits according to said plurality of logic signals and said voltage determination signal such that the plurality of bridge circuits conducts a phase change. If the voltage determination signal stays at a high logic level for a pre-determined time period, the phase selection circuit controls the plurality of signal generators to output a plurality of phase selection signals a high logic level to the plurality of bridge circuits such that the plurality of bridge circuits provide power at the same time to rapidly increase the output voltage.

In summary, the present invention provides a phase controller and a multi-phase voltage converter using the phase controller, capable of controlling the duty cycles of the plurality of bridge circuits according to the variations of the load of the multi-phase voltage converter. When the multi-phase voltage converter enters a heavy-load state, the plurality of bridge circuits may provide power at the same time in rapid response to the request from the back-end circuit.

In order to further understand the techniques, means and effects of the present invention, the following detailed descriptions and appended drawings are hereby referred to, such that, and through which, the purposes, features and aspects of the present invention can be thoroughly and concretely appreciated; however, the appended drawings are merely provided for reference and illustration, without any intention to be used for limiting the present invention.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain the principles of the present invention.

DESCRIPTION OF THE EXEMPLARY EMBODIMENTS

The detailed description set forth below in connection with the appended drawings is intended as a description of certain embodiments of the present invention, and is not intended to represent the only forms that may be developed or utilized. The description sets forth the various functions in connection with the illustrated embodiments, but it is to be understood, however, that the same or equivalent functions may be accomplished by different embodiments that are also intended to be encompassed within the scope of the present invention.

While such terms as "first," "second," etc., may be used to describe various components, such components must not be limited to the above terms. The above terms are used only to distinguish one component from another. For example, a second component may be referred to as a first component within the scope of the present invention, and similarly, the first component may be referred to as the second component. As used herein, the term "and/or" includes any and all combinations of one or more of the associated listed items.

Figure 1:
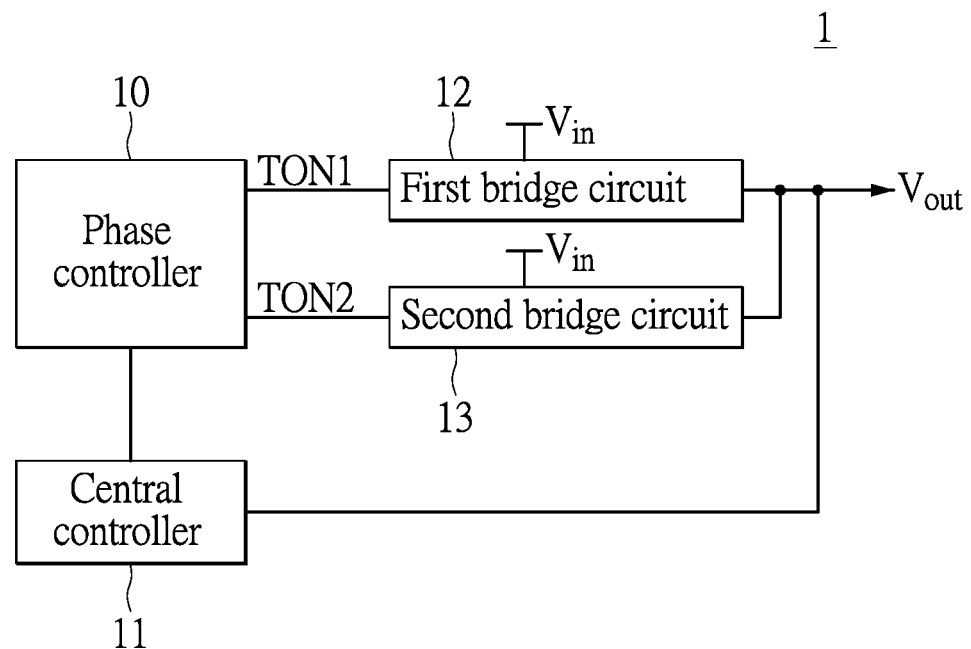
FIG. 1 is a schematic diagram of a multi-phase voltage converter according to one embodiment of the present invention.

Referring to FIG. 1, FIG. 1 is a schematic diagram of a multi-phase voltage converter according to one embodiment of the present invention. The multi-phase voltage converter 1 includes a phase controller 10, a central controller 11 and a plurality of bridge circuits 12 and 13. The phase controller 10 is coupled to the central controller 11 and the plurality of bridge circuits 12 and 13. The central controller 11 is coupled to an output terminal of the plurality of bridge circuits 12 and 13. In the present embodiment, the multi-phase voltage converter 1 is a two-phase DC-to-DC voltage converter. The multi-phase voltage converter 1 includes two bridge circuits, namely, the first bridge circuit 12 and the second bridge circuit 13. However, the present invention is not limited thereto. In other embodiments, the multi-phase voltage converter 1 may include a different number of bridge circuits to implement a boost converter, a buck converter or a buck-boost converter.

The phase controller 10 is controlled by the central controller 11 to provide a plurality of phase selection signals TON1 and TON2 according to the plurality of phase-change signals provided by the central controller 11 so as to control the first bridge circuit 12 and the second bridge circuit 13 to conduct the phase change. Detailed descriptions of the structure of the phase controller 10 will be further presented herein with FIG. 3.

The structure of the first bridge circuit 12 is similar to that of the second bridge circuit 13. The plurality of bridge circuits 12 and 13 includes logic and/or coding circuitry configured to conduct the phase change according to the phase selection signals TON1 and TON2 provided by the phase controller 10 and alternately provide back-end circuits (for, example, other electronic devices) with an output voltage $V_{out}$. Detailed descriptions of the structures of the plurality of bridge circuits will be further presented herein with FIG. 2.

The central controller 11 includes logic and/or coding circuitry configured to detect the output voltage $V_{out}$ outputted by the plurality of bridge circuits and provide the phase controller 10 with the plurality of phase signals according to the variation of the output voltage $V_{out}$ to drive the phase controller 10 to control the plurality of bridge circuits to conduct the phase change.

Figure 2:
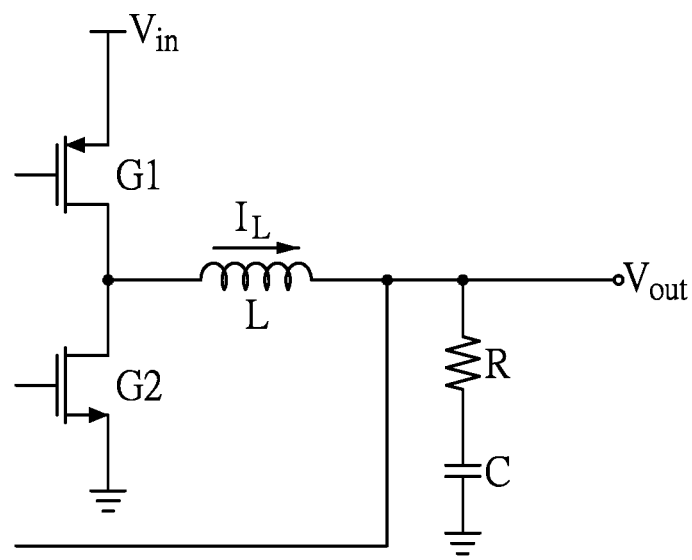
FIG. 2 is a schematic diagram of a bridge circuit according to one embodiment of the present invention.

Referring to FIG. 2, FIG. 2 is a schematic diagram of a bridge circuit according to one embodiment of the present invention. The schematic diagram of the bridge circuit in FIG. 2 represents the first bridge circuit 12 or the second bridge circuit 13. Each of the plurality of bridge circuits 12 and 13 includes an upper bridge switch G1, a lower bridge switch G2, an inductor L, a resistor R and a capacitor C. In the present embodiment, the upper bridge switch G1 is a p-type metal-oxide-semiconductor field-effect transistor (p-MOSFET), and the lower bridge switch G2 is an n-type metal-oxide-semiconductor field-effect transistor (n-MOSFET). However, the present invention is not limited thereto. In other embodiments, the upper bridge switch G1 and the lower bridge switch G2 can be any combination of a p-type metal-oxide-semiconductor field-effect transistor and/or an n-type metal-oxide-semiconductor field-effect transistor.

The source of the upper bridge switch G1 receives an input voltage $V_{in}$, and the drain of the upper bridge switch G1 is coupled to a first terminal of the inductor L. The drain of the lower bridge switch G2 is coupled to the drain of the upper bridge switch G1, and the source of the lower bridge switch G2 is grounded. A second terminal of the inductor L is coupled to a terminal of the resistor R and an output terminal. The other terminal of the resistor R is coupled to a terminal of the capacitor C. The other terminal of the capacitor C is grounded.

Moreover, each of the plurality of bridge circuits 12 and 13 further includes a driving circuit (not shown in FIG. 2). The gate of the upper bridge switch G1 and the gate of the lower bridge switch G2 are coupled to the driving circuit. The driving circuit receives the plurality of phase selection signals TON1 and TON2 provided by the phase controller 10 and provides a pulse-width modulation (PWM) signal according to the plurality of phase selection signals TON1 and TON2 to turn on the upper bridge switch G1 and the lower bridge switch G2. The input voltage $V_{in}$ can be adjusted by controlling the duty cycles of the upper bridge switch G1 and the lower bridge switch G2 so as to increase or decrease the voltage.

On the other hand, the second terminal of the inductor L is further coupled to the central controller 11. The central controller 11 detects an inductor current $I_L$ flowing through the inductor L, and calculates the output voltage $V_{out}$ according to the inductor current $I_L$. Then, the central controller 11 compares the output voltage $V_{out}$ and a pre-determined voltage. When the output voltage $V_{out}$ is higher than the pre-determined voltage, the central controller 11 determines that the output voltage $V_{out}$ provided by the bridge circuit fails to meet the request from the back-end circuit. Then, the central controller 11 outputs a voltage determination signal CPOUT at a high logic level to the phase controller 10 to drive the phase controller 10 to control the plurality of bridge circuits 12 and 13 to conduct the phase change. On the contrary, when the output voltage $V_{out}$ is lower than the pre-determined voltage, the central controller 11 determines that it is not required to conduct the phase change, and outputs a voltage determination signal CPOUT at a low logic level to the phase controller 10.

Figure 3:
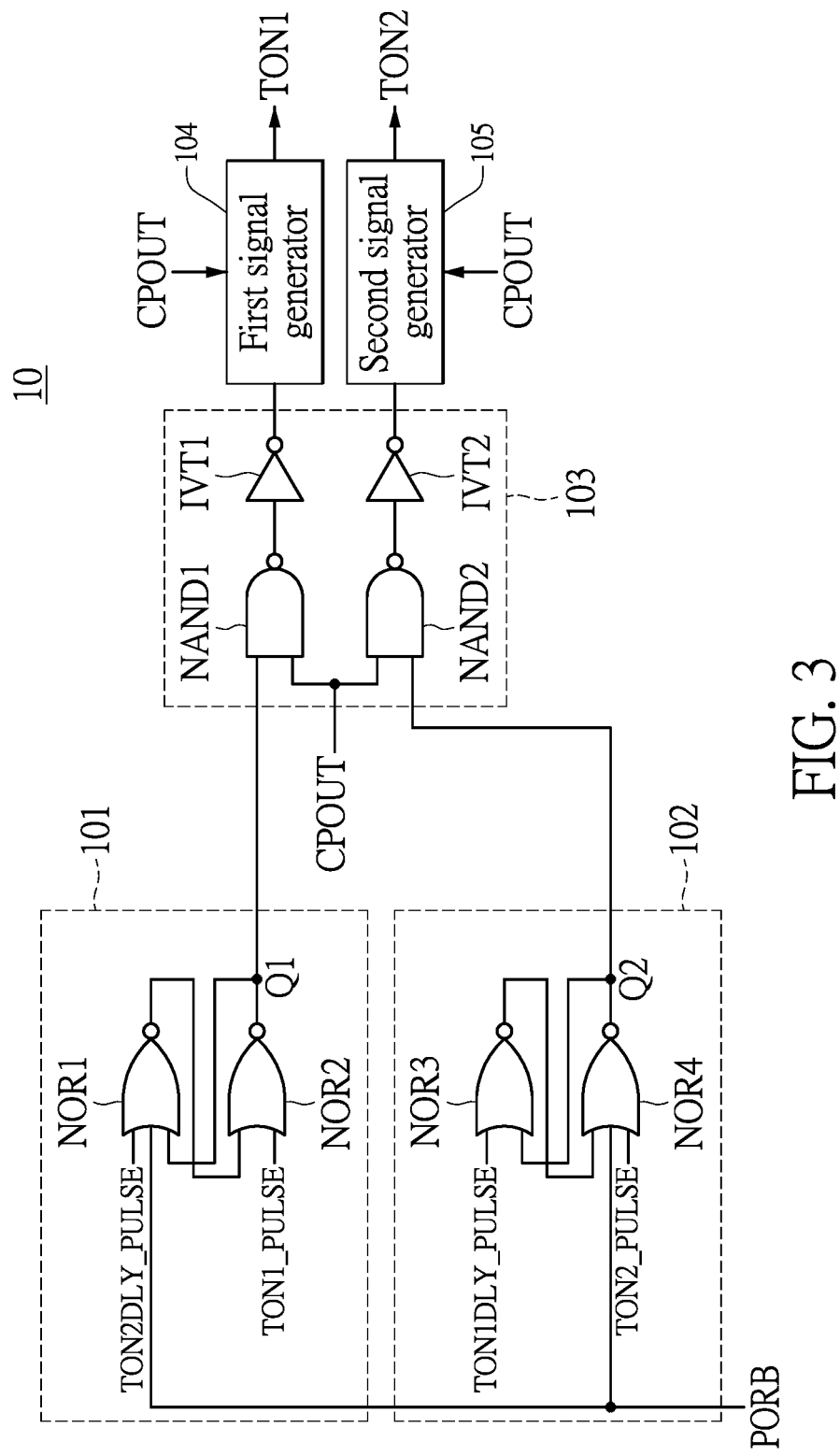
FIG. 3 is a schematic diagram of a phase controller according to one embodiment of the present invention.

Referring to FIG. 3, FIG. 3 is a schematic diagram of a phase controller according to one embodiment of the present invention. The phase controller 10 includes a plurality of logic control circuits 101 and 102, a phase selection circuit 103, and a plurality of signal generators 104 and 105. The central controller 11 is coupled to the plurality of logic control circuits 101 and 102, the phase selection circuit 103 and the plurality of signal generators 104 and 105. The plurality of logic control circuits 101 and 102 is coupled to the phase selection circuit 103, respectively. The phase selection circuit 103 is coupled to the plurality of signal generators 104 and 105. The plurality of signal generators 104 and 105 is coupled to the plurality of bridge circuits 12 and 13, respectively.

It should be noted that, since the present embodiment is exemplified by a two-phase DC-to-DC voltage converter, the phase controller 10 only includes two logic control circuits (i.e., the first logic control circuit 101 and the second logic control circuit 102) and two signal generators (i.e., the first signal generator 104 and the second signal generator 105). Persons with ordinary skill in the art would understand that the number of logic control circuits and signal generators is equal to the number of phases of the multi-phase voltage converter 1 such that the phase controller 10 is capable of controlling a corresponding bridge circuit according to different logic control circuits and signal generators.

The first logic control circuit 101 and the second logic control circuit 102 include logic and/or coding circuitry configured to respectively receive a plurality of phase-change signals TON1_PULSE and TON2_PULSE provided by the central controller 11 and respectively output a plurality of logic signals Q1 and Q2 to the phase selection circuit 103 according to the plurality of phase-change signals TON1_PULSE and TON2_PULSE.

Furthermore, the first logic control circuit 101 includes a first NOR gate NOR1 and a second NOR gate NOR2. A first input terminal of the first NOR gate NOR1 receives a second delayed phase-change signal TON2DLY_PULSE provided by the central controller 11. A first input terminal of the second NOR gate NOR2 is coupled to an output terminal of the first NOR gate NOR1. A second input terminal of the second NOR gate NOR2 receives a first phase-change signal TON1_PULSE. An output terminal of the second NOR gate NOR2 is coupled to a second input terminal of the first NOR gate NOR1 and the phase selection circuit 103.

The second logic control circuit 102 includes a third NOR gate NOR3 and a fourth NOR gate NOR4. A first input terminal of the third NOR gate NOR3 receives a first delayed phase-change signal TON1DLY_PULSE. A first input terminal of the fourth NOR gate NOR4 is coupled to an output terminal of the third NOR gate NOR3. A second input terminal of the fourth NOR gate NOR4 receives a second phase-change signal TON2_PULSE. An output terminal of the fourth NOR gate NOR4 is coupled to a second input terminal of the third NOR gate NOR3 and the phase selection circuit 103.

The first phase-change signal outputted by the central controller 11 controls the first logic control circuit 101 to conduct the phase change, and the second delayed phase-change signal TON2DLY_PULSE enables the first logic control circuit 101 to prepare for the phase change. Moreover, the second phase-change signal TON2_PULSE outputted by the central controller 11 controls the second logic control circuit 102 to conduct the phase change, and the first delayed phase-change signal TON1DLY_PULSE enables the second logic control circuit 102 to prepare for the phase change. The central controller 11 uses the first phase-change signal TON1_PULSE, the second phase-change signal TON2_PULSE, the first delayed phase-change signal TON1DLY_PULSE and the second delayed phase-change signal TON2DLY_PULSE to conduct the phase change, which will be described with FIG. 4 and FIG. 5 herein.

Moreover, a third input terminal of the first NOR gate NOR1 and a third input terminal of the fourth NOR gate NOR4 receive a reset signal PORB provided by the central controller 11, respectively, to reset parameters or voltages in the first NOR gate NOR1 and the fourth NOR gate NOR4. Every time when the multi-phase voltage converter 1 is turned on, the central controller 11 outputs the reset signal PORB to the first NOR gate NOR1 and the fourth NOR gate NOR4 and outputs the first phase-change signal TON1_PULSE to the first logic control circuit 101 such that every time the multi-phase voltage converter 1 is turned on, to first activate the first logic control circuit 101.

The phase selection circuit 103 includes logic and/or coding circuitry configured to receive the plurality of logic signals Q1 and Q2 and the voltage determination signal provided by the central controller 11, and output the first control signal and the second control signal, respectively, to the first signal generator 104 and the second signal generator 105 according to the plurality of logic signals Q1 and Q2 and the voltage determination signal CPOUT. The first signal generator 104 and the second signal generator 105 further output the first phase selection signal TON1 and the second phase selection signal TON2, respectively, according to the voltage determination signal CPOUT, the first control signal and the second control signal, to control the switching between the plurality of bridge circuits.

Furthermore, the phase selection circuit 103 includes a first NAND gate NAND1, a first inverter IVT1, a second NAND gate NAND2 and a second inverter IVT2. A first input terminal of the first NAND gate NAND1 is coupled to the first logic control circuit 101, and a second input terminal of the first NAND gate NAND1 receives the voltage determination signal CPOUT. An input terminal of the first inverter IVT1 is coupled to an output terminal of the first NAND gate NAND1, and an output terminal of the first inverter IVT1 is coupled to the first signal generator 104. A first input terminal of the second NAND gate NAND2 receives the voltage determination signal CPOUT, and a second input terminal of the second NAND gate NAND2 is coupled to the second logic control circuit 102. An input terminal of the second inverter IVT2 is coupled to an output terminal of the second NAND gate NAND, and an output terminal of the second inverter IVT2 is coupled to the second signal generator 105.

The first NAND gate NAND1 and the second NAND gate NAND2 receive a first logic signal Q1 and a second logic signal Q2 provided by the first logic control circuit 101 and the second logic control circuit 102, respectively, and output signals to the plurality of inverters IVT1 and IVT2, respectively, according to the plurality of logic signals Q1 and Q2 and the voltage determination signal CPOUT.

The output terminal of the first signal generator 104 is coupled to one of the bridge circuits (such as the first bridge circuit 12). The first signal generator 104 is configured to receive the first control signal outputted by the first inverter IVT1 and the voltage determination signal CPOUT provided by the central controller 11, and output a first phase selection signal TON1 with a fixed duty cycle to the first bridge circuit 12 to drive the first bridge circuit 12.

The output terminal of the second signal generator 105 is coupled to another bridge circuit (for example, the second bridge circuit 13). The second signal generator 105 is configured to receive the second control signal outputted by the second inverter IVT2 and the voltage determination signal CPOUT provided by the central controller 11, and outputs the second phase selection signal TON2 with a fixed duty cycle to the second bridge circuit 13 to drive the second bridge circuit 13.

Figure 4:
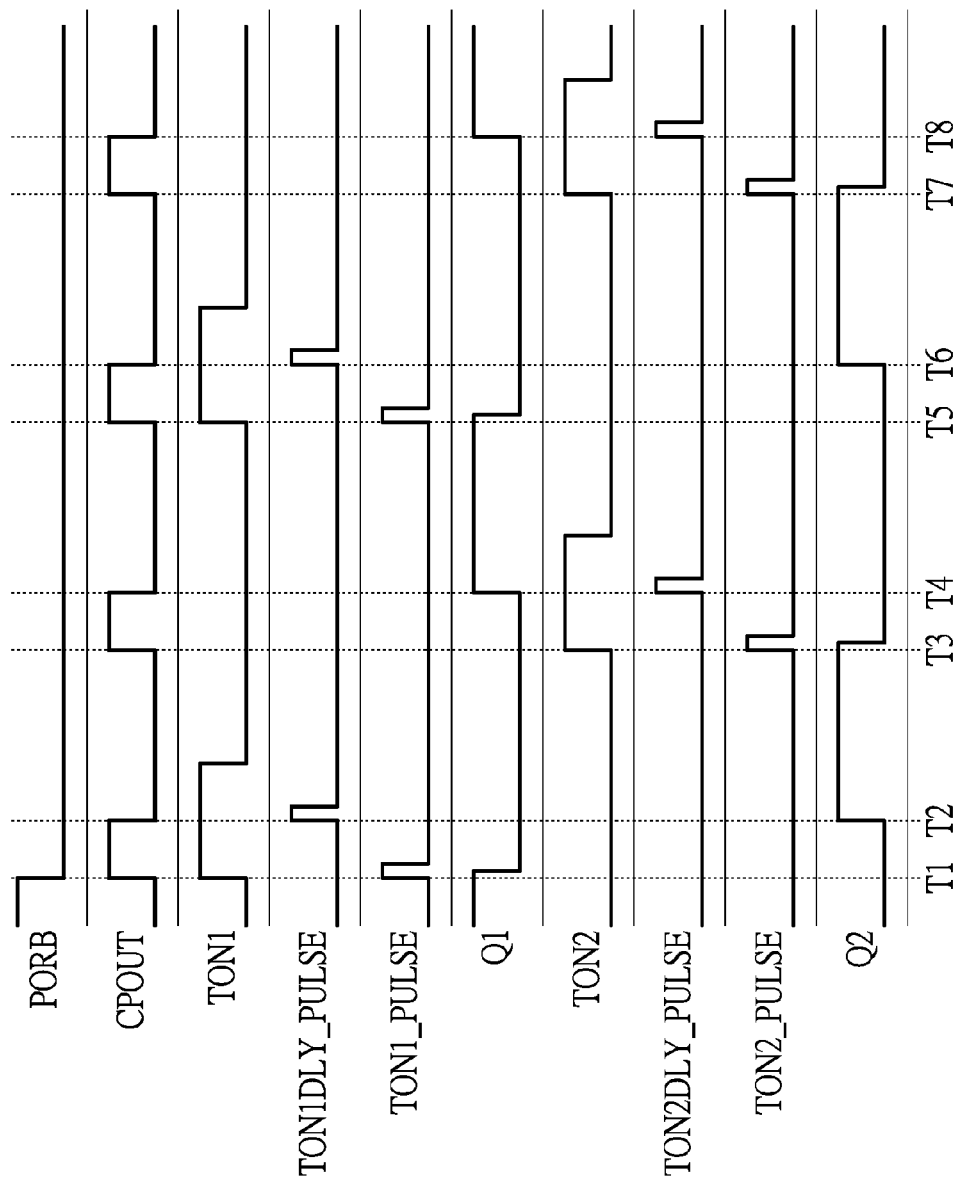
FIG. 4 is a wave-form diagram of a multi-phase voltage converter in a single-phase operation according to one embodiment of the present invention.

The phase-change process conducted by the multi-phase voltage converter 1 controlled by the phase controller 10 and the central controller 11 will be described with a wave-form diagram. Referring to FIG. 4, FIG. 4 is a wave-form diagram of a multi-phase voltage converter in a single-phase operation according to one embodiment of the present invention. At time T1, the multi-phase voltage converter 1 is turned on. The central controller 11 outputs a reset signal PORB to the first logic control circuit 101 and the second logic control circuit 102 such that the first logic control circuit 101 and the second logic control circuit 102 are reset to be activated in sequence.

Then, the central controller 11 outputs a voltage determination signal CPOUT at a high logic level to the phase controller 10 to control the first bridge circuit 12 to provide power. On the other hand, the central controller 11 outputs a first phase-change signal TON1_PULSE at a high logic level to the first logic control circuit 101. The second NOR gate NOR2 of the first logic control circuit 101 receives the first phase-change signal TON1_PULSE at a high logic level, such that the first logic signal Q1 outputted by the second NOR gate NOR2 is switched from a high logic level to a low logic level. It should be noted that, owing to signal propagation delay, the second NOR gate NOR2 does not output the first logic signal Q1 at a low logic level right after receiving the first phase-change signal TON1_PULSE at a high logic level. Instead, the second NOR gate NOR2 outputs the first logic signal Q1 at a low logic level after a short delayed time period.

Since the first logic signal Q1 is not switched from a high logic level to a low logic level immediately, the first NAND gate NAND1 of the phase selection circuit 103 receives the voltage determination signal CPOUT at a high logic level and the first logic signal Q1 at a high logic level, and outputs a signal at a low logic level to the first inverter IVT1. The first inverter IVT1 inverts the signal and then outputs the first control signal at a high logic level to the first signal generator 104. The first signal generator 104 outputs the first phase selection signal TON1 at a high logic level to the first bridge circuit 12 according to the first control signal at a high logic level and the voltage determination signal CPOUT at a high logic level. The first bridge circuit 12 starts to provide the output voltage $V_{out}$ according to the first phase selection signal TON1 at a high logic level.

It should be noted that the first phase selection signal TON1 stays at a high logic level for a pre-determined time period. The duty cycle of the first phase selection signal TON1 depends on the output voltage $V_{out}$. The present invention is not limited to the actual value of the duty cycle of the first phase selection signal TON1. Persons with ordinary skill in the art may decide the duty cycle of the first phase selection signal TON1 according to practical demands and applications.

Moreover, since the duty cycle of the first phase selection signal TON1 is a pre-determined time period, it is not affected when the first logic signal Q1 is switched to a low logic level.

At time T2, the requested power of the back-end circuit drops such that the output voltage $V_{out}$ provided by the first bridge circuit 12 is lower than a pre-determined voltage. The central controller 11 outputs the voltage determination signal CPOUT at a low logic level to the phase controller 10. On the other hand, the central controller 11 outputs the first delayed phase-change signal TON1DLY_PULSE at a high logic level to the second logic control circuit 102 such that the second logic control circuit 102 prepares for the phase change. The third NOR gate NOR3 of the second logic control circuit 102 outputs a signal at a low logic level to the fourth NOR gate NOR4 such that the fourth NOR gate NOR4 outputs the second logic signal Q2 at a high logic level.

The second NAND gate NAND2 of the phase selection circuit 103 receives the voltage determination signal CPOUT at a low logic level and the second logic signal Q2 at a high logic level, and outputs a signal at a high logic level to the second inverter IVT2. The second inverter IVT2 outputs the second control signal at a low logic level to the second signal generator 105. Meanwhile, the voltage determination signal CPOUT and the second control signal are both at a low logic level. Accordingly, the second signal generator 105 does not output the second phase selection signal TON2 at a high logic level, but outputs the second phase selection signal TON2 at a low logic level to the second bridge circuit 13.

At time T3, the requested power of the back-end circuit rises such that the output voltage $V_{out}$ outputted by the multi-phase voltage converter 1 drops. The central controller 11 outputs the voltage determination signal CPOUT at a high logic level to the phase controller 10 again to control the first bridge circuit 12 and the second bridge circuit 13 to conduct the phase change.

On the other hand, the central controller 11 outputs the second phase-change signal TON2_PULSE at a high logic level to the second logic control circuit 102. The fourth NOR gate NOR4 of the second logic control circuit 102 receives the second phase-change signal TON2_PULSE at a high logic level such that the second logic signal Q2 outputted by the fourth NOR gate NOR4 is switched from a high logic level to a low logic level. Similarly, owing to signal propagation delay, the second logic signal Q2 is not switched from a high logic level to a low logic level until a short delayed time period has passed.

The second NAND gate NAND2 of the phase selection circuit 103 receives the voltage determination signal CPOUT at a high logic level and the second logic signal Q2 at a high logic level, and outputs a signal at a low logic level to the second inverter IVT2. The second inverter IVT2 inverts the signal and then outputs the second control signal at a high logic level to the second signal generator 105. The second signal generator 105 outputs the second phase selection signal TON2 at a high logic level to the second bridge circuit 13 according to the second control signal at a high logic level and the voltage determination signal CPOUT at a high logic level. The second bridge circuit 13 starts to provide the output voltage $V_{out}$ according to the second phase selection signal TON2 at a high logic level. It should be noted that the phase selection circuit 103 outputs the first phase selection signal TON1 at a low logic level to the first bridge circuit 12 such that the first bridge circuit 12 does not provide the back-end circuit with power. More particularly, similar to the first phase selection signal TON1, the second phase selection signal TON2 has a fixed duty cycle.

At time T4, the requested power of the back-end circuit drops such that the output voltage $V_{out}$ provided by the second bridge circuit 13 is lower than a pre-determined voltage. Similarly, the central controller 11 outputs the voltage determination signal CPOUT at a low logic level to the phase controller 10. On the other hand, the central controller 11 outputs the second delayed phase-change signal TON2DLY_PULSE at a high logic level to the first logic control circuit 101 such that the first logic control circuit 101 prepares for the phase change. The first NOR gate NOR1 of the first logic control circuit 101 outputs a signal at a low logic level to the second NOR gate NOR2 such that the second NOR gate NOR2 outputs the first logic signal Q1 at a high logic level.

The first NAND gate NAND1 of the phase selection circuit 103 receives the voltage determination signal CPOUT at a low logic level and the first logic signal Q1 at a high logic level, and outputs a signal at a high logic level to the first inverter IVT1. The first inverter IVT1 outputs the first control signal at a low logic level to the first signal generator 104. Meanwhile, the voltage determination signal CPOUT and the first control signal are both at a low logic level. The first signal generator 104 does not output the first phase selection signal TON1 at a high logic level. Instead, the first signal generator 104 outputs the first phase selection signal TON1 at a low logic level to the first bridge circuit 12.

Signal variations from time T5 to time T6 are similar to those from time T1 to time T2. When the voltage determination signal CPOUT turns to be at a high logic level and the first bridge circuit 12 corresponding to the first logic control circuit 101 provides the output voltage $V_{out}$, the central controller 11 controls the plurality of bridge circuits 12 and 13 to conduct the phase change such that the first bridge circuit 12 replaces the second bridge circuit 13 to start to provide the back-end circuit with the output voltage $V_{out}$.

Signal variations from time T7 to time T8 are similar to those from time T3 to time T4. When the voltage determination signal CPOUT turns to be at a high logic level and the second bridge circuit 13 corresponding to the second logic control circuit 102 provides the output voltage $V_{out}$, the central controller 11 controls the plurality of bridge circuits 12 and 13 to conduct the phase change such that the second bridge circuit 13 replaces the first bridge circuit 12 to start to provide the back-end circuit with the output voltage $V_{out}$. In the previous embodiment, when the multi-phase voltage converter 1 enters a light-load state, the central controller 11 controls the plurality of bridge circuits to provide the output voltage $V_{out}$. The central controller 11 adjusts the duty cycles of the first logic signal Q1 and the second logic signal Q2 according to the output voltage $V_{out}$ outputted to the back-end circuit. The first logic signal Q1 and the second logic signal Q2 affect the first phase selection signal TON1 and the second phase selection signal TON2 directly. In other words, the central controller 11 controls the phase change frequencies of the first bridge circuit 12 and the second bridge circuit 13 by adjusting the duty cycles of the first logic signal Q1 and the second logic signal Q2. If the back-end circuit requests higher power, the phase change frequencies of the first bridge circuit 12 and the second bridge circuit 13 become higher such that the output voltage $V_{out}$ rises.

Figure 5:
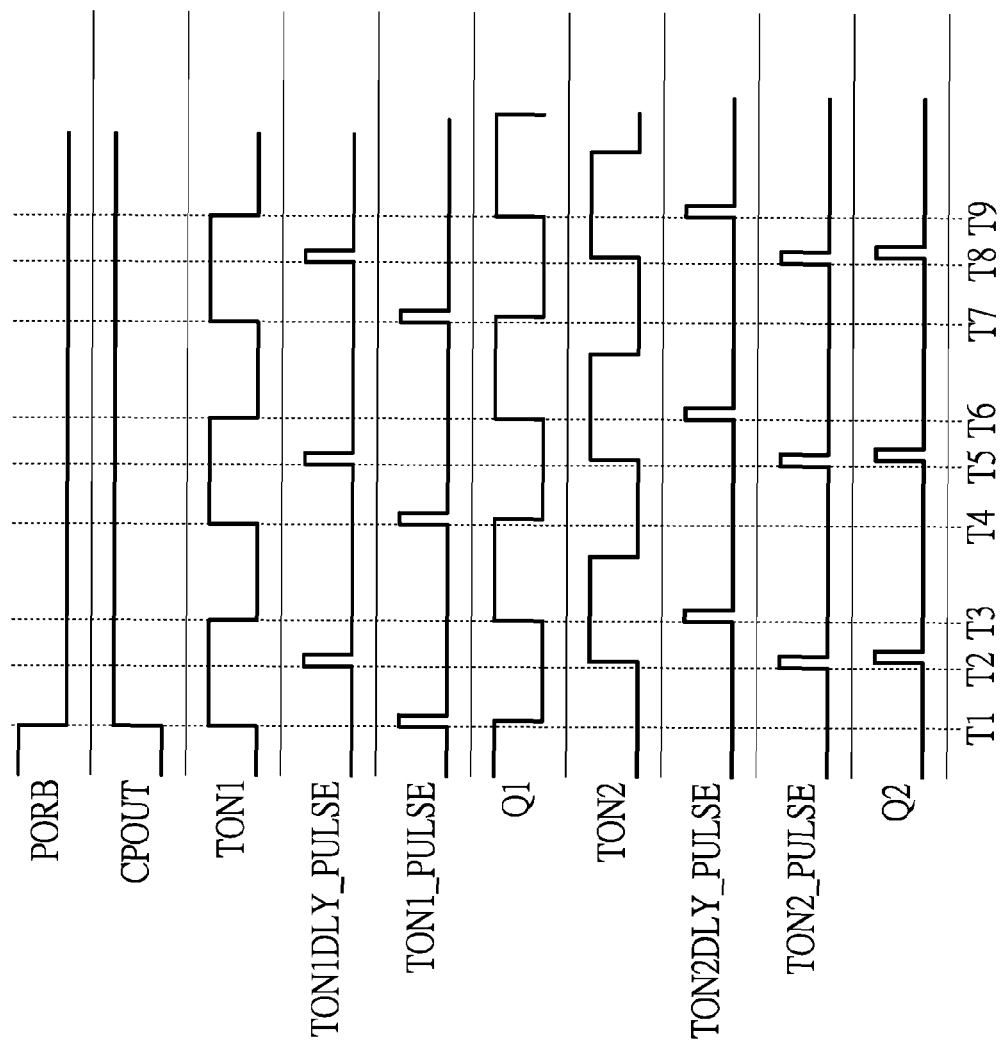
FIG. 5 is a wave-form diagram of a multi-phase voltage converter in a multi-phase operation according to one embodiment of the present invention.

Referring to FIG. 5, FIG. 5 is a wave-form diagram of a multi-phase voltage converter in a multi-phase operation according to one embodiment of the present invention. At time T1, the multi-phase voltage converter 1 is turned on. The central controller 11 outputs a reset signal PORB to the first logic control circuit 101 and the second logic control circuit 102 such that the first logic control circuit 101 and the second logic control circuit 102 are reset to be activated in sequence.

Then, the central controller 11 outputs a voltage determination signal CPOUT at a high logic level to the phase controller 10 to control the first bridge circuit 12 to provide power. On the other hand, the central controller 11 outputs a first phase-change signal TON1_PULSE at a high logic level to the first logic control circuit 101 such that a first logic signal Q1 outputted by the second NOR gate NOR2 of the first logic control circuit 101 is switched from a high logic level to a low logic level. Similar to the previous embodiments, the first logic signal Q1 is not switched from a high logic level to a low logic level until a short delayed time period has passed.

The first NAND gate NAND1 of the phase selection circuit 103 receives the voltage determination signal CPOUT at a high logic level and the first logic signal Q1 at a high logic level, and outputs a signal at a low logic level to the first inverter IVT1. The first inverter IVT1 outputs the first control signal at a high logic level to the first signal generator 104. The first signal generator 104 outputs the first phase selection signal TON1 at a high logic level to the first bridge circuit 12 according to the first control signal at a high logic level and the voltage determination signal CPOUT at a high logic level. The first bridge circuit 12 starts to provide the output voltage $V_{out}$ according to the first phase selection signal TON1 at a high logic level.

Different from the previous embodiment, at time T2, the requested power by the back-end circuit does not drop such that the output voltage $V_{out}$ provided by the first bridge circuit 12 stays higher than the pre-determined voltage after the first bridge circuit 12 has provided power for a pre-determined time period (for example, the time period from time T1 to time T2). In other words, the voltage determination signal CPOUT has stayed at a high logic level for over the pre-determined time period. Meanwhile, the central controller 11 determines that the first bridge circuit 12 fails to meet the request from the back-end circuit. Then, the central controller 11 outputs the first delayed phase-change signal TON1DLY_PULSE at a high logic level to the second logic control circuit 102. Meanwhile, the central controller 11 outputs the second phase-change signal TON2_PULSE at a high logic level to the second logic control circuit 102 such that the fourth NOR gate NOR4 of the second logic control circuit 102 outputs the second logic signal Q2 at a high logic level. Similarly, the second logic signal Q2 is not switched from a low logic level to a high logic level until a short delayed time period has passed.

The second NAND gate NAND2 of the phase selection circuit 103 receives the voltage determination signal CPOUT at a high logic level and the second logic signal Q2 at a high logic level, and outputs a signal at a low logic level to the second inverter IVT2. The second inverter IVT2 outputs the second control signal at a high logic level to the second signal generator 105. The second signal generator 105 outputs the second phase selection signal TON2 at a high logic level to the second bridge circuit 13 according to the second control signal at a high logic level and the voltage determination signal CPOUT at a high logic level such that the second bridge circuit 13 starts to provide power. In brief, the phase selection circuit 103 drives the first bridge circuit 12 and the second bridge circuit 13 to provide power at the same time according to the first logic signal Q1 and the second logic signal Q2 at a high logic level so as to rapidly increase the output voltage $V_{out}$.

At time T3, the duty cycle of the first phase selection signal TON1 ends. However, the voltage determination signal CPOUT stays at a high logic level such that the central controller 11 outputs the second delayed phase-change signal TON2DLY_PULSE at a high logic level to the first logic control circuit 101 to control the first logic control circuit 101 to provide power again.

Moreover, after the second bridge circuit 13 has provided power for a time period, the central controller 11 controls the second phase selection signal TON2 to switch to a low logic level so as to temporarily lower the power outputted by the second bridge circuit 13.

At time T4, if the voltage determination signal CPOUT still stays at a high logic level, the central controller 11 outputs the first phase-change signal TON1_PULSE at a high logic level to the first logic control circuit 101 such that the first logic signal Q1 outputted by the second NOR gate NOR2 is switched from a high logic level to a low logic level. Similarly, the first logic signal Q1 is not switched from a high logic level to a low logic level until a short delayed time period has passed.

Then, the first NAND gate NAND1 outputs a signal at a low logic level according to the voltage determination signal CPOUT at a high logic level and the first logic signal Q1 at a high logic level such that the first signal generator 104 outputs the first phase selection signal TON1 at a high logic level to the first bridge circuit 12. Finally, the first bridge circuit 12 starts to provide the output voltage $V_{out}$.

At time T5, since the voltage determination signal CPOUT has stayed at a high logic level for over a pre-determined time period (for example, the time period from time T4 to time T5), the central controller 11 outputs the first delayed phase-change signal TON1DLY_PULSE at a high logic level to the second logic control circuit 102. Meanwhile, the central controller 11 outputs the second phase-change signal TON2_PULSE at a high logic level to the second logic control circuit 102 such that the fourth NOR gate NOR4 outputs the second logic signal Q2 at a high logic level.

The second NAND gate NAND2 outputs a signal at a low logic level to the second inverter IVT2 according to the voltage determination signal CPOUT at a high logic level and the second logic signal Q2 at a high logic level such that the second signal generator 105 outputs the second phase selection signal TON2 at a high logic level to the second bridge circuit 13. Finally, the second bridge circuit 13 starts to operate to assist the first bridge circuit 12 to provide the back-end circuit with power.

At time T6, the duty cycle of the first phase selection signal TON1 ends. The voltage determination signal CPOUT still stays at a high logic level. Then, the central controller 11 outputs the second delayed phase-change signal TON2DLY_PULSE at a high logic level to the first logic control circuit 101 such that the first logic control circuit 101 prepares to provide power.

Signal propagation from time T7 to time T9 is similar to that from time T1 to time T3 or that from time T4 to time T6. When the multi-phase voltage converter 1 enters a heavy-load state, the central controller 11 controls the duty cycles of the plurality of bridge circuits to be overlapped such that the first bridge circuit 12 and the second bridge circuit 13 provide the back-end circuit with power at the same time. Meanwhile, the output voltage $V_{out}$ is equal to the sum of the power provided by the first bridge circuit 12 and the second bridge circuit 13.

In summary, the present invention provides a phase controller and a multi-phase voltage converter using the phase controller, capable of controlling the duty cycles of the plurality of bridge circuits according to the variations of the load of the multi-phase voltage converter. When the multi-phase voltage converter enters a heavy-load state, the plurality of bridge circuits may provide power at the same time in rapid response to the request from the back-end circuit.

For a conventional two-phase DC-to-DC voltage converter, the plurality of bridge circuits fails to provide power at the same time. Therefore, the maximum duty cycle of the plurality of bridge circuits is 50%. However, in the present invention, the phase controller and the multi-phase voltage converter using the phase controller use a phase controller to provide a duty cycle of the plurality of bridge circuits exceeding 50% so as to provide power at the same time.

The above-mentioned descriptions represent merely the exemplary embodiment of the present invention, without any intention to limit the scope of the present invention thereto. Various equivalent changes, alterations or modifications based on the claims of present invention are all consequently viewed as being embraced by the scope of the present invention.

What is claimed is:

1. A phase controller for a multi-phase voltage converter, comprising:
    a plurality of logic control circuits configured to receive a plurality of phase-change signals and output a plurality of logic signals according to said plurality of phase-change signals, respectively;
    a plurality of signal generators configured to provide a plurality of bridge circuits with a plurality of phase selection signals to drive said plurality of bridge circuits; and
    a phase selection circuit coupled to said plurality of logic control circuits and said plurality of signal generators and configured to receive said plurality of logic signals and a voltage determination signal and control said plurality of signal generators according to said plurality of logic signals and said voltage determination signal;
    wherein, when an output voltage provided by said multi-phase voltage converter is higher than a pre-determined voltage, said phase selection circuit receives said voltage determination signal at a high logic level, and said phase selection circuit controls said plurality of signal generators to output said plurality of phase selection signals to said plurality of bridge circuits according to said plurality of logic signals and said voltage determination signal such that said plurality of bridge circuits conducts a phase change;
    wherein, if said voltage determination signal stays at a high logic level for a pre-determined time period, said phase selection circuit controls said plurality of signal generators to output a plurality of phase selection signals at a high logic level to said plurality of bridge circuits such that said plurality of bridge circuits provides power at the same time to rapidly increase said output voltage.

2. The phase controller of claim 1, wherein said multi-phase voltage converter is a two-phase DC-to-DC voltage converter and said plurality of logic control circuits comprise a first logic control circuit and a second logic control circuit.

3. The phase controller of claim 2, wherein said first logic control circuit comprises:
   a first NOR gate comprising a first input terminal receiving a second delayed phase-change signal; and
   a second NOR gate comprising a first input terminal coupled to an output terminal of said first NOR gate, a second input terminal receiving a first phase-change signal and an output terminal coupled to a second input terminal of said first NOR gate and said phase selection circuit.

4. The phase controller of claim 3, wherein, when said voltage determination signal turns to be at a high logic level and a first bridge circuit corresponding to said first logic control circuit provides said output voltage, said first NOR gate receives said second delayed phase-change signal at a low logic level, said second NOR gate receives said first phase-change signal at a high logic level, and said second NOR gate outputs a first logic signal to said phase selection circuit such that said phase selection circuit controls a first signal generator of said plurality of signal generators to output a first phase selection signal at a high logic level to said first bridge circuit according to said voltage determination signal at a high logic level and said first logic signal to conduct said phase change.

5. The phase controller of claim 3, wherein a third input terminal of said first NOR gate receives a reset signal to reset parameters or voltages in said first NOR gate.

6. The phase controller of claim 2, wherein said second logic control circuit comprises:
   a third NOR gate comprising a first input terminal receiving a first delayed phase-change signal; and
   a fourth NOR gate comprising a first input terminal coupled to an output terminal of said third NOR gate, a second input terminal receiving a second phase-change signal and an output terminal coupled to a second input terminal of said third NOR gate and said phase selection circuit.

7. The phase controller of claim 6, wherein, when said voltage determination signal turns to be at a high logic level and a second bridge circuit corresponding to said second logic control circuit provides said output voltage, said third NOR gate receives said first delayed phase-change signal at a low logic level, said fourth NOR gate receives said second phase-change signal at a high logic level, and said fourth NOR gate outputs a second logic signal to said phase selection circuit such that said phase selection circuit controls a second signal generator of said plurality of signal generators to output a second phase selection signal at a high logic level to said second bridge circuit according to said voltage determination signal at a high logic level and said first logic signal to conduct said phase change.

8. The phase controller of claim 6, wherein, if said voltage determination signal stays at a high logic level for over said pre-determined time period, said fourth NOR gate receives said second phase-change signal at a high logic level and said fourth NOR gate outputs a second logic signal at a high logic level such that said phase selection circuit controls said plurality of bridge circuits according to said voltage determination signal at a high logic level and said second logic signal at a high logic level to provide power at the same time.

9. The phase controller of claim 6, wherein a third input terminal of said fourth NOR gate receives a reset signal to reset parameters or voltages in said fourth NOR gate.

10. The phase controller of claim 2, wherein said phase selection circuit comprises:
    a first NAND gate comprising a first input terminal coupled to said first logic control circuit and a second input terminal receiving said voltage determination signal;
    a first inverter comprising an input terminal coupled to an output terminal of said first NAND gate and an output terminal coupled to one of said plurality of signal generators;
    a second NAND gate comprising a first input terminal receiving said voltage determination signal and a second input terminal coupled to said second logic control circuit; and
    a second inverter comprising an input terminal coupled to an output terminal of said second NAND gate and an output terminal coupled to another one of said plurality of signal generators;
    wherein said first NAND gate and said second NAND gate receive said plurality of logic signals provided by said first logic control circuit and said second logic control circuit, respectively, and control said plurality of signal generators, respectively, according to said plurality of logic signals and said voltage determination signal.

11. A multi-phase voltage converter, comprising:
    a plurality of bridge circuits;
    a central controller coupled to an output terminal of said plurality of bridge circuits and configured to generate a voltage determination signal according to an output voltage provided by said plurality of bridge circuits and generate a plurality of phase signals according to said voltage determination signal; and
    a phase controller coupled to said plurality of bridge circuits and said central controller, comprising:
      a plurality of logic control circuits configured to receive a plurality of phase-change signals and output a plurality of logic signals according to said plurality of phase-change signals, respectively;
      a plurality of signal generators configured to provide said plurality of bridge circuits with a plurality of phase selection signals to drive said plurality of bridge circuits; and
      a phase selection circuit coupled to said plurality of logic control circuits and said plurality of signal generators and configured to receive said plurality of logic signals and said voltage determination signal and control said plurality of signal generators according to said plurality of logic signals and said voltage determination signal;
    wherein, when an output voltage provided by said multi-phase voltage converter is higher than a pre-determined voltage, said phase selection circuit receives said voltage determination signal at a high logic level, and said phase selection circuit controls said plurality of signal generators to output said plurality of phase selection signals to said plurality of bridge circuits according to said plurality of logic signals and said voltage determination signal such that said plurality of bridge circuits conduct a phase change;
    wherein, if said voltage determination signal stays at a high logic level for a pre-determined time period, said phase selection circuit controls said plurality of signal generators to output a plurality of phase selection signals a high logic level to said plurality of bridge circuits such that said plurality of bridge circuits provide power at the same time to rapidly increase said output voltage.

12. The multi-phase voltage converter of claim 11, wherein said multi-phase voltage converter is a two-phase DC-to-DC voltage converter and said plurality of logic control circuits comprise a first logic control circuit and a second logic control circuit.

13. The multi-phase voltage converter of claim 12, wherein said first logic control circuit comprises:
   a first NOR gate comprising a first input terminal receiving a second delayed phase-change signal provided by said central controller; and
   a second NOR gate comprising a first input terminal coupled to an output terminal of said first NOR gate, a second input terminal receiving a first phase-change signal provided by said central controller and an output terminal coupled to a second input terminal of said first NOR gate and said phase selection circuit.

14. The multi-phase voltage converter of claim 13, wherein, when said voltage determination signal turns to be at a high logic level and a first bridge circuit corresponding to said first logic control circuit provides said output voltage, said first NOR gate receives said second delayed phase-change signal at a low logic level, said second NOR gate receives said first phase-change signal at a high logic level, and said second NOR gate outputs a first logic signal at a low logic level to said phase selection circuit such that said phase selection circuit controls a first signal generator of said plurality of signal generators to output a first phase selection signal at a high logic level to said first bridge circuit according to said voltage determination signal at a high logic level and said first logic signal to conduct said phase change.

15. The multi-phase voltage converter of claim 13, wherein a third input terminal of said first NOR gate receives a reset signal provided by said central controller to reset parameters or voltages in said first NOR gate.

16. The multi-phase voltage converter of claim 12, wherein said second logic control circuit comprises:
   a third NOR gate comprising a first input terminal receiving a first delayed phase-change signal provided by said central controller; and
   a fourth NOR gate comprising a first input terminal coupled to an output terminal of said third NOR gate, a second input terminal receiving a second phase-change signal provided by said central controller and an output terminal coupled to a second input terminal of said third NOR gate and said phase selection circuit.

17. The multi-phase voltage converter of claim 16, wherein, when said voltage determination signal turns to be at a high logic level and a second bridge circuit corresponding to said second logic control circuit provides said output voltage, said third NOR gate receives said first delayed phase-change signal at a low logic level, said fourth NOR gate receives said second phase-change signal at a high logic level, and said fourth NOR gate outputs a second logic signal to said phase selection circuit such that said phase selection circuit controls a second signal generator of said plurality of signal generators to output a second phase selection signal at a high logic level to said second bridge circuit according to said voltage determination signal at a high logic level and said first logic signal to conduct said phase change.

18. The multi-phase voltage converter of claim 16, wherein, if said voltage determination signal stays at a high logic level for over said pre-determined time period, said fourth NOR gate receives said second phase-change signal at a high logic level and said fourth NOR gate outputs a second logic signal at a high logic level such that said phase selection circuit controls said plurality of bridge circuits according to said voltage determination signal at a high logic level and said second logic signal at a high logic level to provide power at the same time.

19. The multi-phase voltage converter of claim 16, wherein a third input terminal of said fourth NOR gate receives a reset signal to reset parameters or voltages in said fourth NOR gate.

20. The multi-phase voltage converter of claim 12, wherein said phase selection circuit comprises:
   a first NAND gate comprising a first input terminal coupled to said first logic control circuit and a second input terminal receiving said voltage determination signal;
   a first inverter comprising an input terminal coupled to an output terminal of said first NAND gate and an output terminal coupled to one of said plurality of signal generators;
   a second NAND gate comprising a first input terminal receiving said voltage determination signal and a second input terminal coupled to said second logic control circuit; and
   a second inverter comprising an input terminal coupled to an output terminal of said second NAND gate and an output terminal coupled to another one of said plurality of signal generators;
   wherein said first NAND gate and said second NAND gate receive said plurality of logic signals provided by said first logic control circuit and said second logic control circuit, respectively, and control said plurality of signal generators, respectively, according to said plurality of logic signals and said voltage determination signal.

* * * * *